United States Patent
Cihlar et al.

(10) Patent No.: US 9,255,484 B2
(45) Date of Patent: Feb. 9, 2016

(54) AFT FRAME AND METHOD FOR COOLING AFT FRAME

(75) Inventors: David William Cihlar, Greenville, SC (US); Patrick Benedict Melton, Horse Shoe, NC (US); David Leach, Simpsonville, SC (US); Kevin Weston McMahan, Greer, SC (US)

(73) Assignee: General Electric Company, Schenectady, NY (US)

( * ) Notice: Subject to any disclaimer, the term of this patent is extended or adjusted under 35 U.S.C. 154(b) by 1206 days.

(21) Appl. No.: 13/049,237

(22) Filed: Mar. 16, 2011

(65) Prior Publication Data

US 2012/0234018 A1 Sep. 20, 2012

(51) Int. Cl.
 *F23R 3/60* (2006.01)
 *F01D 9/02* (2006.01)
 (Continued)

(52) U.S. Cl.
 CPC .............. *F01D 9/023* (2013.01); *F01D 25/12* (2013.01); *F02C 7/20* (2013.01); *F05D 2260/201* (2013.01); *F05D 2260/202* (2013.01); *F05D 2260/2322* (2013.01); *F23R 3/60* (2013.01); *F23R 2900/00012* (2013.01); *F23R 2900/03041* (2013.01); *F23R 2900/03042* (2013.01); *F23R 2900/03043* (2013.01); *F23R 2900/03044* (2013.01)

(58) Field of Classification Search
 CPC ........... F23R 3/002; F23R 3/007; F23R 3/02; F23R 3/04; F23R 3/06; F23R 3/08; F23R 3/10; F23R 3/16; F23R 3/18; F23R 3/20; F23R 3/22; F23R 3/24; F23R 3/26; F23R 3/42; F23R 3/425; F23R 3/44; F23R 3/46; F23R 3/48; F23R 3/50; F23R 3/52; F23R 3/54; F23R 3/56; F23R 3/58; F23R 3/60; F23R 2900/00005; F23R 2900/00012; F23R 2900/03041; F23R 2900/03042; F23R 2900/03043; F23R 2900/03044; Y02T 50/675; F01D 9/023; F01D 25/12; F02C 3/14; F02C 3/145; F02C 3/16; F02C 7/20
 USPC ........... 60/752, 753, 754, 755, 756, 757, 758, 60/759, 760, 772, 782, 796, 797, 798, 799, 60/800
 See application file for complete search history.

(56) References Cited

U.S. PATENT DOCUMENTS

| 4,195,474 A | * | 4/1980 | Bintz et al. ................. 60/730 |
| 4,297,843 A | | 11/1981 | Sato et al. |
| 4,465,284 A | * | 8/1984 | Szema .......................... 277/628 |

(Continued)

FOREIGN PATENT DOCUMENTS

CN 101893255 A 11/2010

*Primary Examiner* — Phutthiwat Wongwian
*Assistant Examiner* — Michael B Mantyla
(74) *Attorney, Agent, or Firm* — Dority & Manning, P.A.

(57) ABSTRACT

An aft frame and a method for cooling an aft frame are disclosed. In one embodiment, an aft frame for a transition piece in a combustor is disclosed. The combustor includes the transition piece and an impingement sleeve at least partially defining a flow path therebetween. The aft frame includes a body and a generally radially extending cooling passage defined in the body, the cooling passage comprising a first end configured to accept a coolant. The aft frame further includes an exhaust passage defined in the body, the exhaust passage including a first end in communication with the cooling passage and a second end configured for communication with the flow path for flowing the coolant therethrough.

12 Claims, 5 Drawing Sheets

(51) Int. Cl.
*F01D 25/12* (2006.01)
*F02C 7/20* (2006.01)

(56) References Cited

U.S. PATENT DOCUMENTS

| | | | |
|---|---|---|---|
| 5,265,412 A * | 11/1993 | Bagepalli et al. | 60/800 |
| 5,414,999 A | 5/1995 | Barnes et al. | |
| 5,749,218 A * | 5/1998 | Cromer et al. | 60/796 |
| 6,010,132 A * | 1/2000 | Bagepalli et al. | 277/355 |
| 6,412,268 B1 * | 7/2002 | Cromer et al. | 60/772 |
| 6,553,766 B2 * | 4/2003 | Shimizu et al. | 60/752 |
| 6,751,962 B1 * | 6/2004 | Kuwabara et al. | 60/800 |
| 6,769,257 B2 * | 8/2004 | Kondo et al. | 60/730 |
| 6,834,507 B2 * | 12/2004 | Jorgensen | 60/800 |
| 6,860,108 B2 * | 3/2005 | Soechting et al. | 60/752 |
| 6,988,369 B2 * | 1/2006 | Conete et al. | 60/796 |
| 7,043,921 B2 * | 5/2006 | Hadder | 60/772 |
| 7,350,360 B2 * | 4/2008 | Graf et al. | 60/798 |
| 7,377,117 B2 * | 5/2008 | Riggi et al. | 60/796 |
| 7,481,037 B2 * | 1/2009 | Takaya et al. | 60/39.37 |
| 7,784,264 B2 * | 8/2010 | Weaver et al. | 60/39.37 |
| 7,797,948 B2 * | 9/2010 | Weaver et al. | 60/800 |
| 7,908,866 B2 * | 3/2011 | Kato et al. | 60/752 |
| 8,001,787 B2 * | 8/2011 | Sutcu et al. | 60/752 |
| 8,015,818 B2 * | 9/2011 | Wilson et al. | 60/755 |
| 8,091,364 B2 * | 1/2012 | Bottcher et al. | 60/752 |
| 8,092,159 B2 * | 1/2012 | Maldonado | 415/173.1 |
| 8,186,167 B2 * | 5/2012 | Chila et al. | 60/752 |
| 8,245,515 B2 * | 8/2012 | Davis et al. | 60/752 |
| 8,291,709 B2 * | 10/2012 | Cayre et al. | 60/755 |
| 8,353,165 B2 * | 1/2013 | McMahan et al. | 60/796 |
| 8,573,938 B1 * | 11/2013 | Liang | 416/95 |
| 8,661,828 B2 * | 3/2014 | Pieussergues et al. | 60/752 |
| 2002/0112483 A1 | 8/2002 | Kondo et al. | |
| 2003/0046940 A1 * | 3/2003 | Matsuda et al. | 60/796 |
| 2004/0031270 A1 * | 2/2004 | Sileo et al. | 60/796 |
| 2005/0241314 A1 | 11/2005 | Takaya et al. | |
| 2008/0053107 A1 * | 3/2008 | Weaver et al. | 60/800 |
| 2008/0236170 A1 * | 10/2008 | Weaver et al. | 60/800 |
| 2009/0145137 A1 | 6/2009 | Rizkalla et al. | |
| 2009/0324387 A1 | 12/2009 | Turaga | |
| 2010/0003128 A1 | 1/2010 | Chila et al. | |
| 2010/0034643 A1 | 2/2010 | Davis, Jr. et al. | |
| 2010/0205972 A1 | 8/2010 | Chila et al. | |
| 2013/0098063 A1 * | 4/2013 | Mizukami et al. | 60/785 |

* cited by examiner

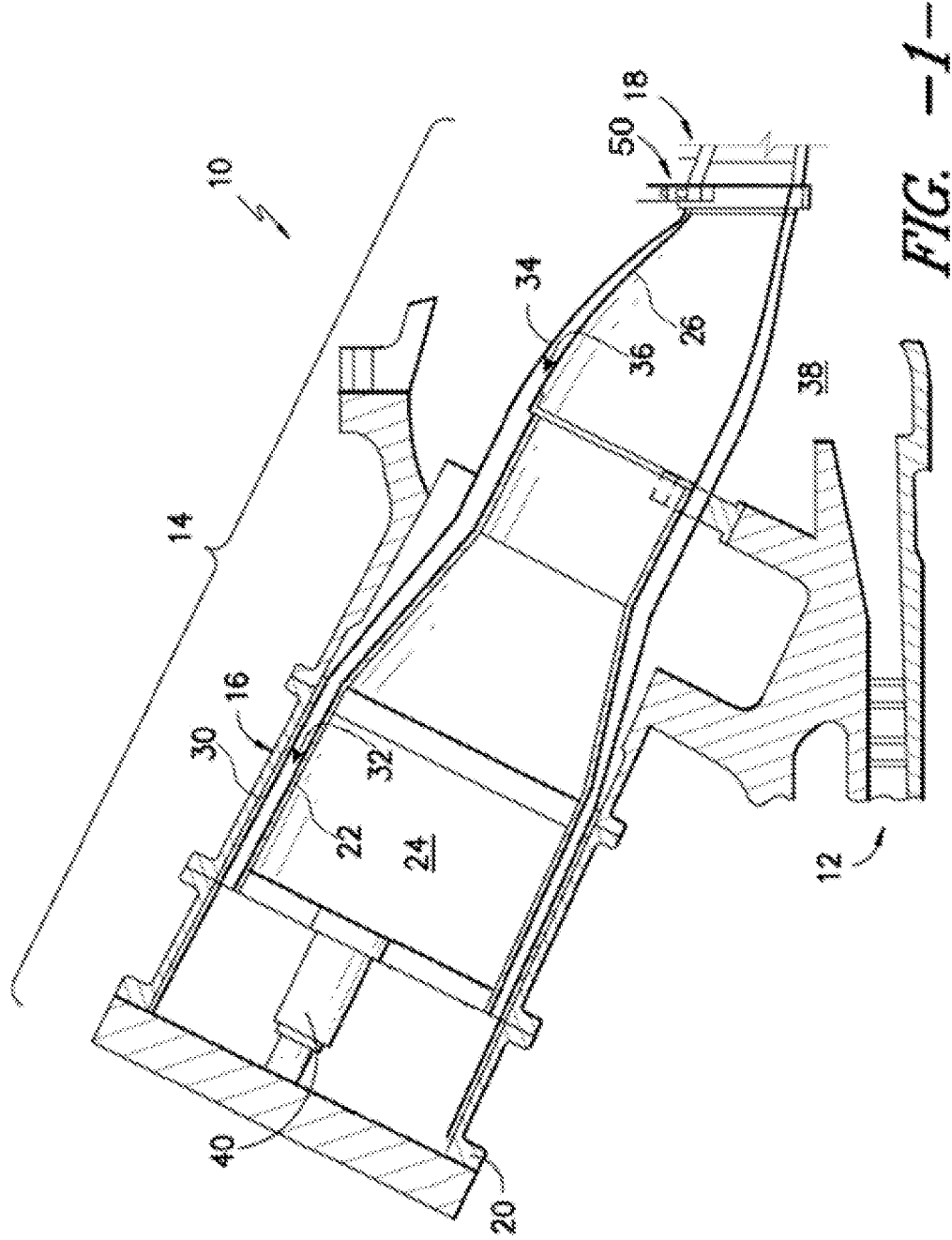
FIG. -1-

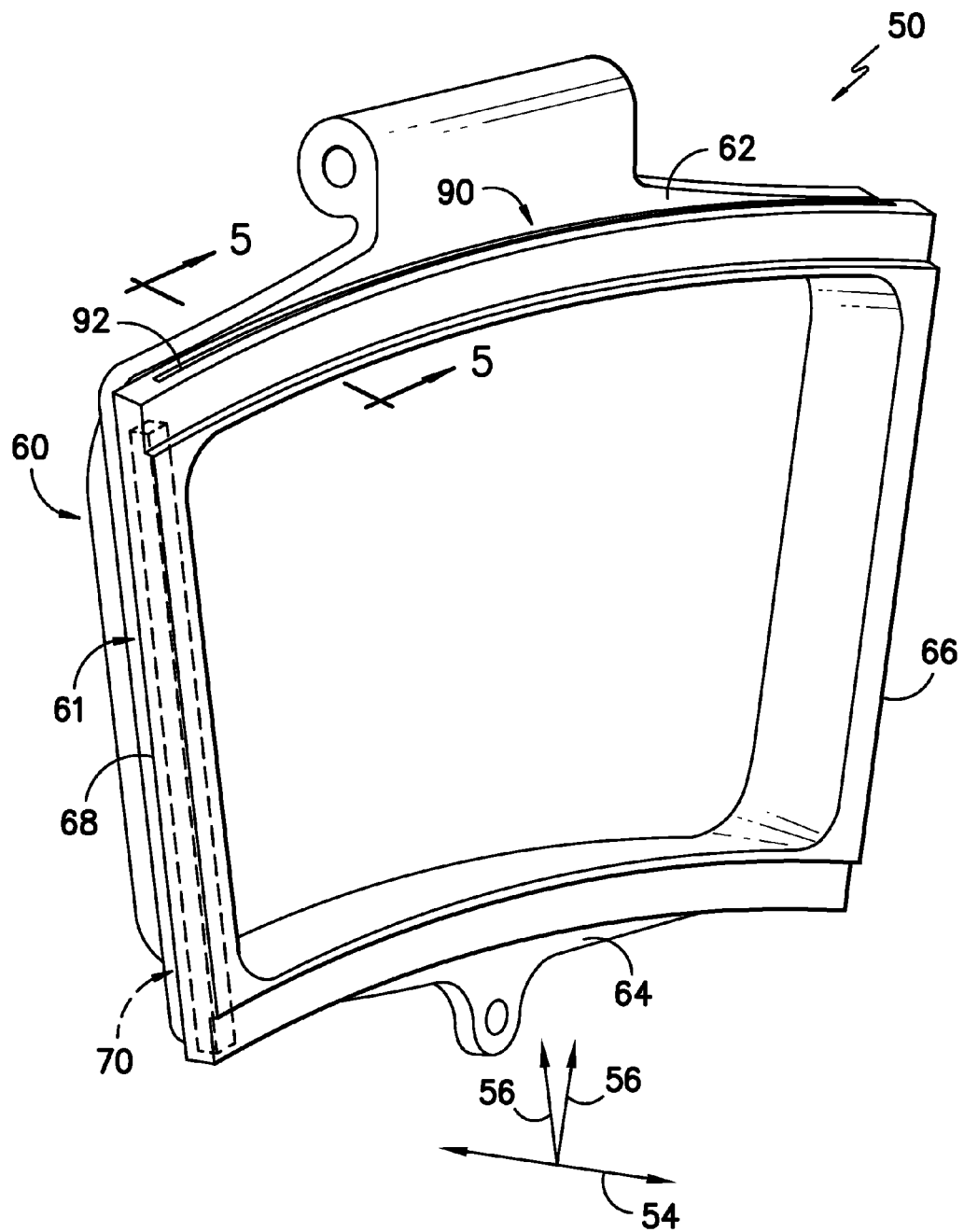
FIG. -2-

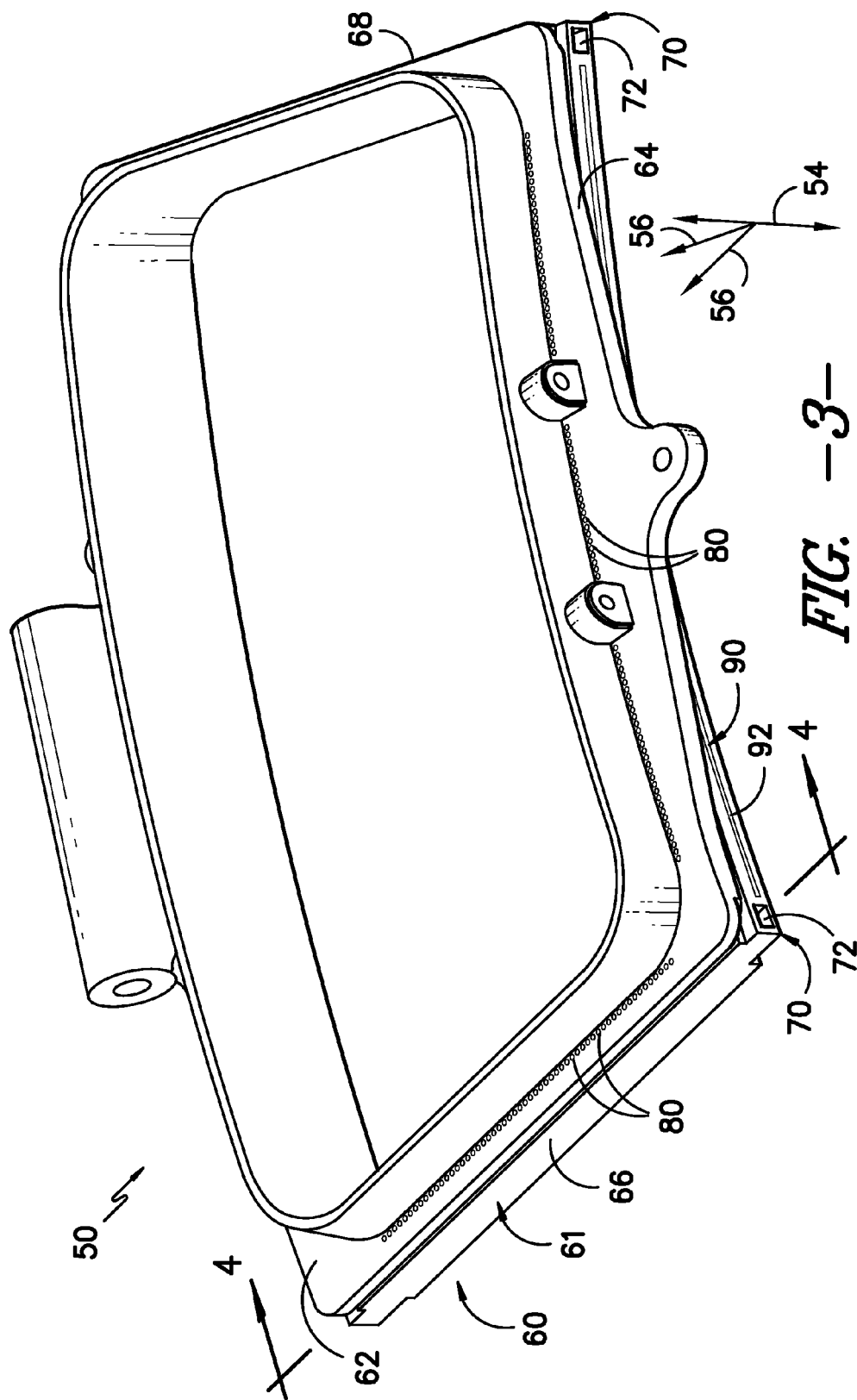
FIG. -3-

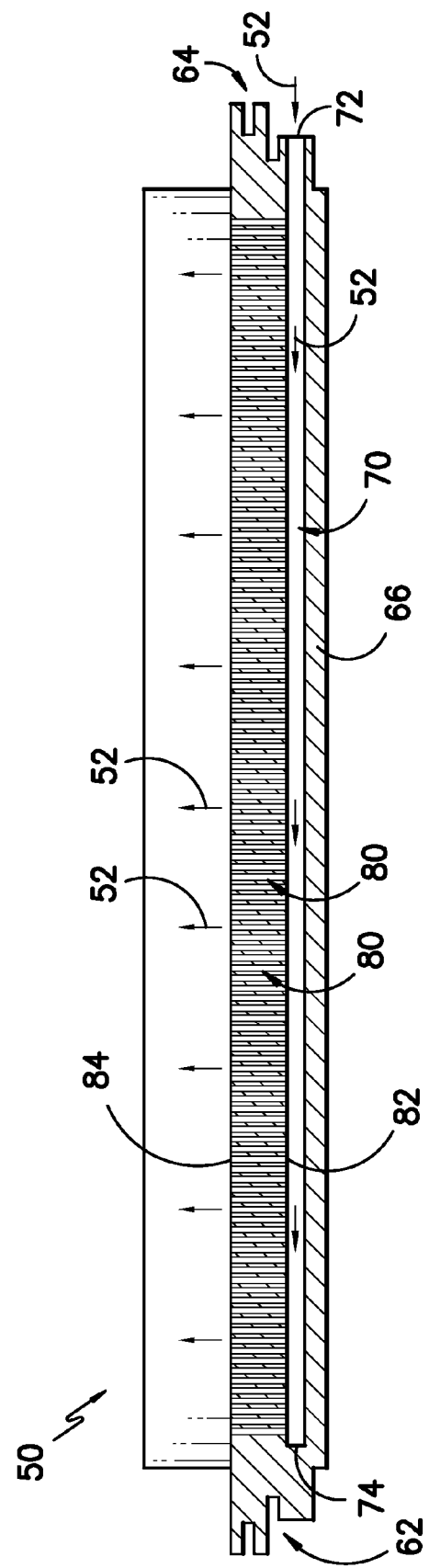
FIG. -4-

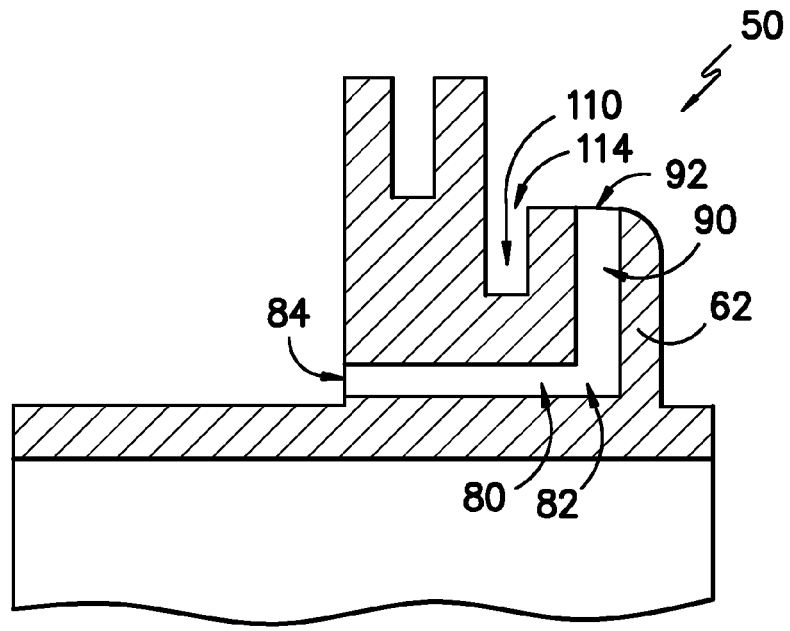
FIG. -5-
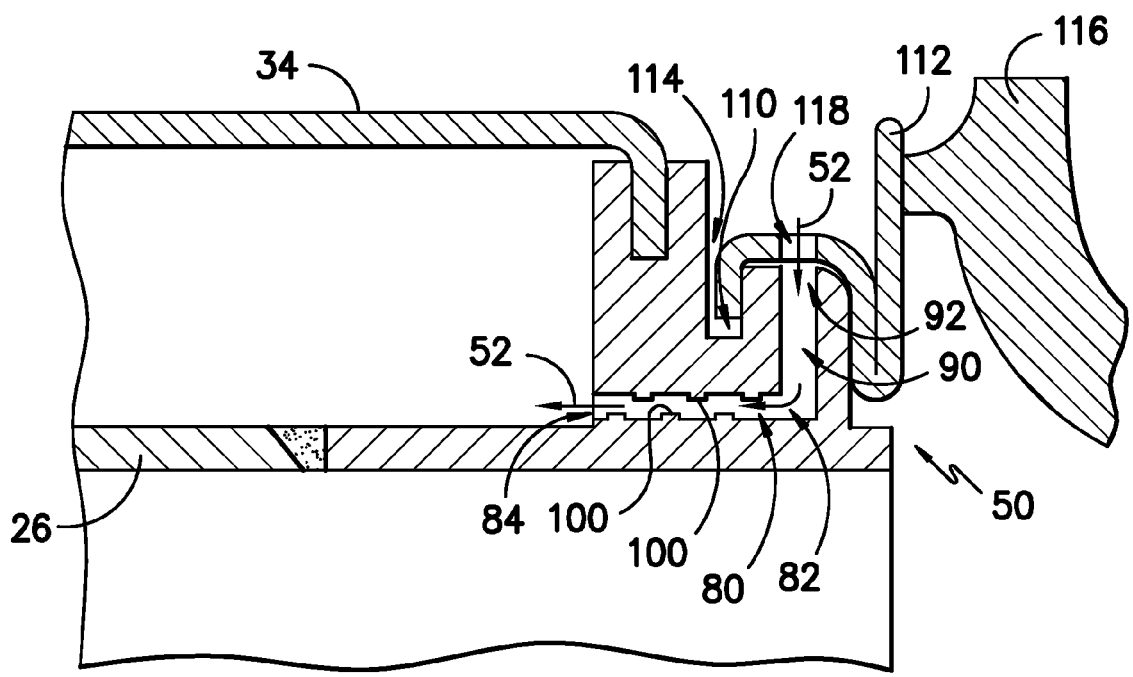
FIG. -6-

AFT FRAME AND METHOD FOR COOLING AFT FRAME

FIELD OF THE INVENTION

The present disclosure relates in general to combustors, and more particularly to aft frames in combustors. Specifically, the present disclosure relates to aft frames with novel cooling features and novel methods for cooling aft frames.

BACKGROUND OF THE INVENTION

Turbine systems are widely utilized in fields such as power generation. For example, a conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

Further, in a typical arrangement, an annular array of combustors is connected to the first stage of the turbine by a plurality of transition pieces. The transition pieces are each shaped at one end to conform to respective combustor liners, and at an opposite end to conform to the inlet of the turbine. Thus, at the opposite end, a transition piece has an aft frame by which the transition piece is secured to the turbine. An impingement sleeve may surround the transition duct, and may be used to direct working fluid discharged from the compressor into contact with the transition piece. This working fluid eventually mixes with the fuel in the combustor.

Currently, some of the working fluid that enters the flow path between the transition piece and the surrounding impingement sleeve is removed through holes in the aft frame. This working fluid, which is used to cool the aft frame, dumps into the hot gas from the combustor just before the hot gas enters the turbine. The problem with this current cooling method is that this working fluid effectively bypasses mixing and combustion in the combustor, thereby effectively increasing the flame temperature and NOx emissions.

Thus, an improved aft frame and method for cooling an aft frame would be desired in the art. For example, an aft frame and a method that allow for cooling of the aft frame without dumping the fluid used to cool the aft frame directly into the hot gas would be advantageous. Further, an aft frame and a method that allow for cooling of the aft frame and then reusing the cooling fluid would be desired.

BRIEF DESCRIPTION OF THE INVENTION

Aspects and advantages of the invention will be set forth in part in the following description, or may be obvious from the description, or may be learned through practice of the invention.

In one embodiment, an aft frame for a transition piece in a combustor is disclosed. The combustor includes the transition piece and an impingement sleeve at least partially defining a flow path therebetween. The aft frame includes a body and a generally radially extending cooling passage defined in the body, the cooling passage comprising a first end configured to accept a coolant. The aft frame further includes an exhaust passage defined in the body, the exhaust passage including a first end in communication with the cooling passage and a second end configured for communication with the flow path for flowing the coolant therethrough.

In another embodiment, an aft frame for a transition piece in a combustor is disclosed. The combustor includes the transition piece and an impingement sleeve at least partially defining a flow path therebetween. The aft frame includes a body defining a periphery, and a cooling slot defined in the body and extending generally about a portion of the periphery of the body, the cooling slot defining an opening configured to accept a coolant. The aft frame further includes an exhaust passage defined in the body, the exhaust passage including a first end in communication with the cooling slot and a second end configured for communication with the flow path for flowing a coolant therethrough.

In another embodiment, a method for cooling an aft frame for a transition piece in a combustor is disclosed. The combustor includes the transition piece and an impingement sleeve at least partially defining a flow path therebetween. The method includes flowing a coolant through a generally radially extending cooling passage defined in the aft frame, flowing the coolant from the cooling passage into an exhaust passage in communication with the cooling passage, and exhausting the coolant from the exhaust passage into the flow path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cross-sectional view of several portions of a gas turbine system according to one embodiment of the present disclosure;

FIG. 2 is a perspective front view of an aft frame according to one embodiment of the present disclosure;

FIG. 3 is a perspective back view of an aft frame according to one embodiment of the present disclosure;

FIG. 4 is a cross-sectional view of an aft frame, along the lines 4-4 of FIG. 3, according to one embodiment of the present disclosure;

FIG. 5 is a cross-sectional view of an aft frame, along the lines 5-5 of FIG. 2, according to one embodiment of the present disclosure; and FIG. 6 is an assembled cross-sectional view, similar to the view of FIG. 5, of an aft frame and various other components of a combustor according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to FIG. 1, a simplified drawing of several portions of a gas turbine system 10 is illustrated. The system 10 comprises a compressor section 12 for pressurizing a working fluid, discussed below, that is flowing through the system 10. Pressurized working fluid discharged from the compressor section 12 flows into a combustor section 14, which is generally characterized by a plurality of combustors 16 (only one of which is illustrated in FIG. 1) disposed in an annular array about an axis of the system 10. The working fluid entering the combustor section 14 is mixed with fuel, such as natural gas or another suitable liquid or gas, and combusted. Hot gases of combustion flow from each combustor 16 to a turbine section 18 to drive the system 10 and generate power.

Each combustor 16 in the gas turbine 10 may include a variety of components for mixing and combusting the working fluid and fuel. For example, the combustor 16 may include a casing 20, such as a compressor discharge casing 20. A variety of sleeves, which may be generally annular sleeves, may be at least partially disposed in the casing 20. For example, a combustor liner 22 may generally define a combustion zone 24 therein. Combustion of the working fluid, fuel, and optional oxidizer may generally occur in the combustion zone 24. The resulting hot gases of combustion may flow downstream through the combustion liner 22 into a transition piece 26. A flow sleeve 30 may generally surround at least a portion of the combustor liner 22 and define a flow path 32 therebetween. An impingement sleeve 34 may generally surround at least a portion of the transition piece 26 and define a flow path 36 therebetween. Working fluid entering the combustor section 14 may flow in the casing 20 through an external annulus 38 defined by the casing 20 and at least partially surrounding the various sleeves. At least a portion of the working fluid may enter the flow paths 32 and 36 through holes (not shown) defined in the flow sleeve and 30 and impingement sleeve 34. As discussed below, the working fluid may then enter the combustion zone 24 for combustion.

The combustor 16 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion.

It should be readily appreciated that a combustor 16 need not be configured as described above and illustrated herein and may generally have any configuration that permits working fluid to be mixed with fuel, combusted and transferred to a turbine section 18 of the system 10. For example, the present disclosure encompasses annular combustors and silo-type combustors as well as any other suitable combustors.

As discussed above, hot gases of combustion flow from each combustor 16 to a turbine section 18 to drive the system 10 and generate power. As shown in FIGS. 1 and 6, an aft frame 50 may be mounted to the transition piece 26 of a combustor 16 to couple the combustor 16 to the turbine section 18. For example, in exemplary embodiments, the aft frame 50 may be welded to the transition piece 26, as shown in FIG. 6, or otherwise mounted to the transition piece 26, as is generally known in the art. Additionally, an end of the impingement sleeve 34 may have a flange that is seated in a slot formed in the aft frame 50, or may otherwise be in contact with the aft frame 50, as is generally known in the art. During operation of the system 10, the aft frame 50 may require cooling. Thus, the present disclosure is directed to an aft frame 50 including novel cooling features, and a novel method for cooling an aft frame 50.

In general, a coolant 52 may be flowed through various novel cooling passages and/or slots defined in the aft frame 50 to cool the aft frame 50. Further the coolant 52 may then be exhausted into flow path 36. The coolant 52 may, in some embodiments, be working fluid, such as compressed air or another suitable fluid. Alternatively, the coolant 52 may be a different fluid from the working fluid, such as a fluid containing nitrogen or a steam. The coolant 52 in these embodiments may provide better cooling properties for cooling the aft frame 50. If the coolant 52 is different than the working fluid, it may in some embodiments be supplied to the aft frame 50 from an independent source. In alternative embodiments, however, the coolant 52 may be supplied to the aft frame 50 from the external annulus 38.

As shown in FIGS. 2 and 3, an aft frame 50 may define a variety of axes with respect to the positioning of the aft frame 50 in a combustor. For example, an axial axis 54 and a radial axis 56 or axes 56 extending radially from the axial axis 54 may be defined, as shown. The axial axis 54 may generally be defined along the flow path through the aft frame 50.

As shown in FIGS. 2 through 6, aft frame 50 may include a body 60. The body 60 may generally define a periphery 61, which may generally encompass the outer peripheral surfaces of the body 60. Further, the body 60 may comprise an upper portion 62, a lower portion 64, a right side portion 66, and a left side portion 68. It should be understood that the aft frame 50 need not be designed as described above, and rather that any suitable design of the aft frame 50 is within the scope and spirit of the present disclosure.

In some embodiments, as shown in FIGS. 2 through 4, the aft frame 50 of the present disclosure, such as the body 60 of the aft frame 50, may define a cooling passage 70 or a plurality of cooling passages 70. The cooling passages 70 may extend generally radially through the body 60. For example, in exemplary embodiments, a cooling passage 70 may be defined in the right side portion 66 and/or the left side portion 68. The cooling passages 70 may be defined in the aft frame 50 during casting of the aft frame 50, or may be machined into the aft frame 50 after casting, or may be formed in the aft frame 50 using any other suitable process or device.

A cooling passage 70 may include a first end 72 and a second end 74. The first end 72 may be configured to accept coolant 52. For example, in exemplary embodiments as shown in FIGS. 2 through 4, the first end 72 may be open and exposed to the external annulus 38, such that a portion of the coolant 52 flowing through the external annulus 38 may flow through the first end 72 into the cooling passage 70. Alternatively, the first end 72 may be in communication with an independent source such that the coolant 52 may be flowed from the independent source into the cooling passage 70.

The second end 74, in exemplary embodiments, may be closed, thus preventing escape of the coolant 52 from the cooling passage 70 through the second end 74. Alternatively, however, the second end 74 may be open or in communication with another suitable conduit.

Thus, during operation of the system 10, coolant 52 may be flowed through cooling passages 70 defined in the aft frame 50. Heat exchange between the surfaces of the aft frame 50 and the coolant 52 may desirably cool the aft frame 50.

Coolant 52 flowed through a cooling passage 70 may further be flowed from the cooling passage 70 into an exhaust passage 80 or a plurality of exhaust passages 80 defined in the body 60 of the aft frame 50. The exhaust passages 80 may extend generally axially through the body 60 from the cooling passages 70. For example, in exemplary embodiments, an exhaust passage 80 may be defined in the right side portion 66 and/or the left side portion 68. The exhaust passages 80 may be defined in the aft frame 50 during casting of the aft frame 50, or may be machined into the aft frame 50 after casting, or may be formed in the aft frame 50 using any other suitable process or device.

An exhaust passage 80 may include a first end 82 and a second end 84 for flowing the coolant therethrough. The first end 82 may be in communication with a cooling passage 70. For example, the first end 82 may open into the cooling passage 70, such that coolant 52 in the cooling passage 70 may flow from the cooling passage 70 through the first end 82 into the exhaust passage 80. The second end 84 may be configured for communication with the flow path 36. For example, the second end 84 may open into the flow path 36, such that coolant 52 flowing through the exhaust passage 80 may be exhausted from the exhaust passage 80 through the second end 84 into the flow path 36.

Thus, during operation of the system 10, coolant 52 may be flowed from cooling passages 70 into an exhaust passage 80 or exhaust passages 80, and then exhausted from the exhaust passages 80 into the flow path 36. Advantageously, this design of cooling passages 70 and exhaust passages 80 may allow for the aft frame 50 to be cooled while ensuring that the coolant 52 used to cool the aft frame 50 is not dumped into interior of the transition piece 26 downstream of the combustion zone 24. Rather the coolant 52 is utilized in the flow path 36 and flow path 32 to cool the transition piece 26 and combustor liner 22, and is then flowed into the combustion zone 24 for mixing and combustion.

It should be understood that while the cooling passages 70 and the exhaust passages 80 of the present disclosure may extend generally radially and axially, respectively, the direction in which the cooling passages 70 and the exhaust passages 80 extend need not be exactly along a radial axis 56 or axial axis 54. For example, the cooling passages 70 and exhaust passages 80 may extend at an angle to a radial axis 56 or axial axis 54, as desired or required for effective cooling and exhaustion.

In some embodiments, as shown in FIGS. 2 through 3 and 5 through 6, the aft frame 50 of the present disclosure, such as the body 60 of the aft frame 50, may define a cooling slot 90 or a plurality of cooling slots 90. The cooling slots 90 may extend generally about a portion of the periphery 61. For example, in exemplary embodiments, a cooling slot 90 may be defined in the upper portion 62 and/or the lower portion 64. Further, in exemplary embodiments, the cooling slots 90 may extend generally about only a portion of the periphery 61. For example, a cooling slot 90 may extend through only a portion of the upper portion 62 and/or the lower portion 64. The cooling slots 90 may be defined in the aft frame 50 during casting of the aft frame 50, or may be machined into the aft frame 50 after casting, or may be formed in the aft frame 50 using any other suitable process or device.

A cooling slot 90 may include an opening 92. The opening 92 may be configured to accept coolant 52. For example, in exemplary embodiments as shown in FIGS. 2 through 3 and 5 through 6, the opening 92 may be open and exposed to the external annulus 38, such that a portion of the coolant 52 flowing through the external annulus 38 may flow through the opening 92 into the cooling slot 90. Alternatively, the opening 92 may be in communication with an independent source such that the coolant 52 may be flowed from the independent source into the cooling slot 90.

Thus, during operation of the system 10, coolant 52 may be flowed through cooling slots 90 defined in the aft frame 50. Heat exchange between the surfaces of the aft frame 50 and the coolant 52 may desirably cool the aft frame 50.

Coolant 52 flowed through a cooling slot 90 may further be flowed from the cooling slot 90 into an exhaust passage 80 or a plurality of exhaust passages 80 defined in the body 60 of the aft frame 50. As discussed above, the exhaust passages 80 may extend generally axially through the body 60 from the cooling slot 90. For example, in exemplary embodiments, an exhaust passage 80 may be defined in the upper portion 62 and/or the lower portion 64.

Further, as discussed above, an exhaust passage 80 may include a first end 82 and a second end 84 for flowing the coolant therethrough. The first end 82 may be in communication with a cooling slot 90. For example, the first end 82 may open into the cooling slot 90, such that coolant 52 in the cooling slot 90 may flow from the cooling slot 90 through the first end 82 into the exhaust passage 80. The second end 84 may be configured for communication with the flow path 36. For example, the second end 84 may open into the flow path 36, such that coolant 52 flowing through the exhaust passage 80 may be exhausted from the exhaust passage 80 through the second end 84 into the flow path 36.

Thus, during operation of the system 10, coolant 52 may be flowed from cooling slot 90 into an exhaust passage 80 or exhaust passages 80, and then exhausted from the exhaust passages 80 into the flow path 36. Advantageously, this design of cooling slot 90 and exhaust passages 80 may allow for the aft frame 50 to be cooled while ensuring that the coolant 52 used to cool the aft frame 50 is not dumped into interior of the transition piece 26 downstream of the combustion zone 24. Rather the coolant 52 is utilized in the flow path 36 and flow path 32 to cool the transition piece 26 and combustor liner 22, and is then flowed into the combustion zone 24 for mixing and combustion.

In some embodiments, as shown in FIG. 6, a turbulator 100 or a plurality of turbulators 100 may be disposed in the exhaust passages 80, the cooling passages 70, or the cooling slots 90. The turbulators 100 may have any suitable shape or size to enhance the turbulent flow of the coolant 52 flowing through the various passages and/or slots. The turbulators may be formed in the aft frame 50 during casting, or mounted or machined into the aft frame 50 after the aft frame 50 is formed, or may be formed in the aft frame 50 using any other suitable process or device. The use of turbulators 100 to enhance the turbulent flow of the coolant 52 may increase cooling of the aft frame 50.

In some embodiments, as shown in FIGS. 5 and 6, the aft frame 50, such as the body 60, may further define a sealing slot 110 or a plurality of sealing slots 110. The sealing slots 110 may extend generally about a portion of periphery 61 or the entire periphery 61 of the body 60. Further, the sealing slots 110 may be configured to receive seals 112 therein. For example, the sealing slots 110 may define openings 114, which may accept seals 112 therein. The seals 112 may be provided to prevent leakage and mixing of hot gas and coolant 52. Further, as shown, the seals 112 may provide a generally sealed interface between the aft frame 50 and a retaining ring 116 of the turbine section 18.

In some embodiments, the cooling slots 90 may be defined upstream of the sealing slots 110. In other embodiments as shown in FIGS. 5 and 6, however, the cooling slots 90 may be defined downstream of the sealing slots 110. It should be noted that "upstream" and "downstream", for purposes of this disclosure, are defined with respect to the hot gas flow through the combustor 16. If the cooling slots 90 are defined downstream of the sealing slots 110, the seals 112 may extend across the openings 92 or portions thereof. Thus, in some embodiments, access holes 118 may be defined in the seals 112. These access holes 118 may allow for the flow of coolant 52 therethrough, such that the coolant 52 may be accepted through the openings 92 into the cooling slots 90. Further, the access holes 118 may increase the cooling of the aft frame 50, by causing the coolant 52 flowing therethrough to impinge on the aft frame 50 after flowing through cooling slots 90, thus causing impingement cooling of the aft frame 50.

The present disclosure is further directed to a method for cooling an aft frame 50. The method may include, for example, flowing a coolant 52 through a generally radially extending cooling passage 70 defined in the aft frame 50, as discussed above. The method may further include, for example, flowing the coolant 52 from the cooling passage 70 into an exhaust passage 80 in communication with the cooling passage 70, as discussed above. Further, the method may include, for example, exhausting the coolant 52 from the exhaust passage 80 into a flow path 36, as discussed above.

Additionally or alternatively, the method may include, for example, flowing a coolant 52 through a cooling slot 90 defined in the aft frame 50, as discussed above. The method may further include, for example, flowing the coolant 52 from the cooling slot 90 into an exhaust passage 80 in communication with the cooling slot 90, as discussed above. Further, the method may include, for example, exhausting the coolant 52 from the exhaust passage 80 into a flow path 36, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aft frame for a transition piece in a combustor, the combustor comprising the transition piece and an impingement sleeve at least partially defining a flow path therebetween, the aft frame comprising:
   a body, the body comprising an upper portion, a lower portion, a left side portion, and a right side portion;
   a generally radially extending cooling passage defined in one of the left side portion or the right side portion of the body, the cooling passage comprising a first end configured to accept a coolant;
   a cooling slot defined in the body and extending generally about a portion of the periphery of the body, the cooling slot defining an opening configured to accept a coolant;
   a plurality of exhaust passages defined in the body, at least one of the plurality of exhaust passages comprising a first end in direct communication with the cooling passage and a second end configured for communication with the flow path for flowing the coolant therethrough and at least another of the plurality of exhaust passages comprising a first end in communication with the cooling slot and a second end configured for communication with the flow path for flowing the coolant therethrough;
   a seal extending across the opening of the cooling slot; and
   an access hole defined in the seal to allow coolant flow therethrough and into the cooling slot through the opening of the cooling slot.

2. The aft frame of claim 1, further comprising a plurality of cooling passages.

3. The aft frame of claim 1, wherein the cooling slot is defined in one of the upper portion or the lower portion.

4. The aft frame of claim 1, further comprising a plurality of cooling slots.

5. The aft frame of claim 1, further comprising a plurality of turbulators disposed in at least one of the plurality of exhaust passages.

6. The aft frame of claim 1, further comprising a sealing slot defined in the body and extending generally about the periphery of the body, the sealing slot configured to receive the seal therein.

7. The aft frame of claim 6, wherein the cooling slot is defined downstream of the sealing slot.

8. An aft frame for a transition piece in a combustor, the combustor comprising the transition piece and an impingement sleeve at least partially defining a flow path therebetween, the aft frame comprising:
   a body defining a periphery;
   a cooling slot defined in the body and extending generally about a portion of the periphery of the body, the cooling slot defining an opening configured to accept a coolant, the opening defined in an outer surface of the body;
   a plurality of exhaust passages defined in the body, each of the plurality of exhaust passages comprising a first end in direct communication with the cooling slot and a second end configured for communication with the flow path for flowing a coolant therethrough;
   a seal extending across the opening of the cooling slot; and
   an access hole defined in the seal to allow coolant flow therethrough and into the cooling slot through the opening of the cooling slot.

9. The aft frame of claim 8, further comprising a sealing slot defined in the body and extending generally about the periphery of the body, the sealing slot configured to receive the seal therein.

10. The aft frame of claim 9, wherein the cooling slot is defined downstream of the sealing slot.

11. The aft frame of claim 8, wherein the body comprises an upper portion, a lower portion, a left side portion, and a right side portion, and wherein the cooling slot is defined in one of the upper portion or the lower portion.

12. The aft frame of claim 8, further comprising a plurality of cooling slots.

* * * * *